Feb. 27, 1962 W. A. RUKA ET AL 3,022,834
TURF AND LAWN CULTIVATOR
Filed July 13, 1959 2 Sheets-Sheet 1

INVENTORS
WILLIAM A. RUKA
WILLIAM L. CAUDILL
BY
*Wright and Wright*
ATTORNEYS

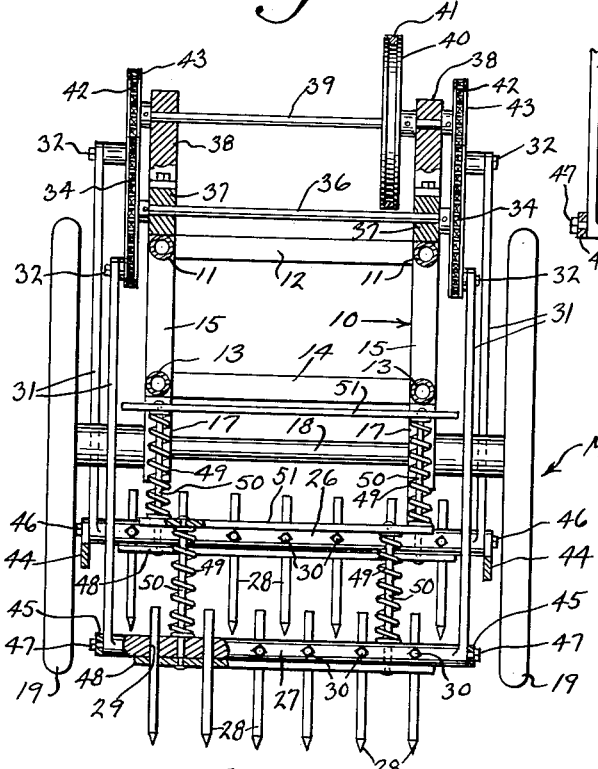

United States Patent Office 3,022,834
Patented Feb. 27, 1962

3,022,834
TURF AND LAWN CULTIVATOR
William A. Ruka and William L. Caudill, both of 601 Ariana, Rte. 3, Box 600, Lakeland, Fla.
Filed July 13, 1959, Ser. No. 826,632
1 Claim. (Cl. 172—21)

This invention appertains to turf and lawn cultivators and more particularly to a novel machine for perforating lawns and the like, to bring about the proper cultivation of the turf or grass by insuring the admittance of air, light and water to the roots thereof.

One of the primary objects of our invention is to provide a machine embodying rows of perforating spikes or tines carried by supporting bars with a novel means for power operating the bars, whereby the spikes or tines will take a predetermined path into and out of the turf for insuring the making of desired types of openings or perforations into the lawn and for facilitating the pulling of the machine over the lawn.

Another salient object of our invention is to provide a comparatively light, mobile machine which can be easily guided over a lawn with a minimum amount of effort and which merely embodies a wheeled frame supporting a drive engine for operating, through a simple mechanical movement, a pair of travelling supporting bars carrying a plurality of spikes or tines, with means operating in conjunction with the mechanical movement for guiding the bars, and consequently, the spikes or tines, in a predetermined, preferred path of travel during the forward movement of the machine.

A further important object of our invention, is to provide a novel means for clearing the rows of spikes or tines from debris, and thus prevent the clogging up of the spikes or tines and the machine.

A still further object of the invention is to provide means for associating the spikes or tines with the bars, whereby the active length of the spikes or tines can be varied to suit different working conditions and whereby individual spikes or tines can be easily removed and replaced when necessary or desirable.

With these and other objects in view, the invention consists in the novel construction, arrangement and formation of parts, as will be hereinafter more specifically described and claimed, and illustrated in the accompanying drawings, in which drawings, FIGURE 1 is a longitudinal vertical sectional view through one preferred type of our machine, taken on the line 1—1 of FIGURE 2, looking in the direction of the arrows;

FIGURE 3 is a transverse sectional view through the machine taken on the line 3—3 of FIGURE 1, looking in the direction of the arrows;

FIGURE 4 is a fragmentary transverse sectional view through the machine, illustrating one of the supporting bars with its spikes or tines in detail and the means for clearing the spikes or tines from debris;

FIGURE 5 is an enlarged fragmentary detail sectional view illustrating the path of travel of one of the supporting bars and its tines, and FIGURE 6 is a fragmentary detail, longitudinal sectional view through a slightly modified form of our machine.

Figure 1:
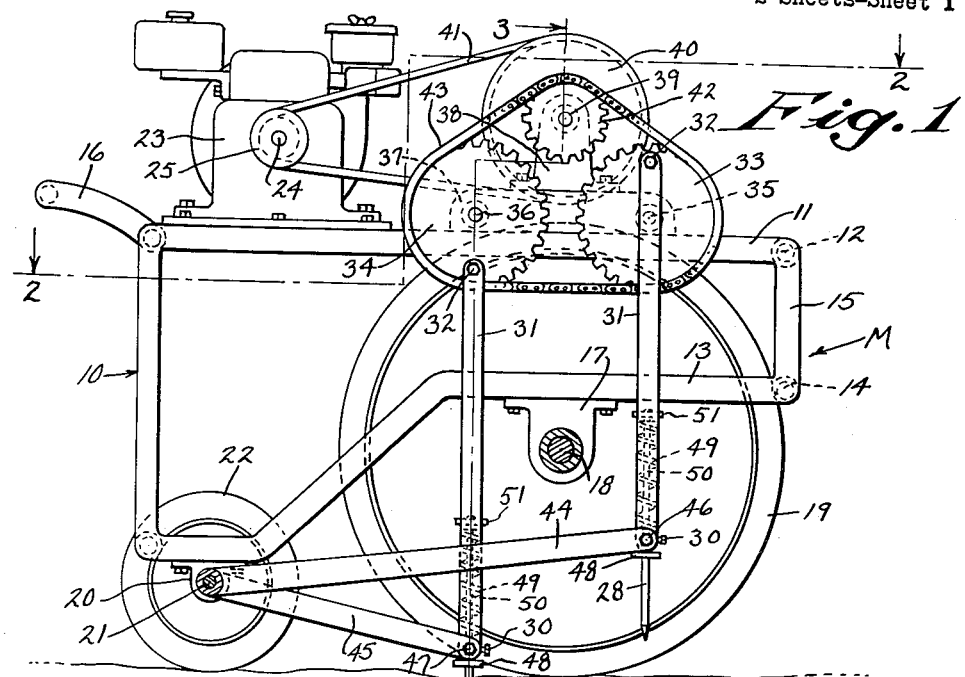
Figure 2:
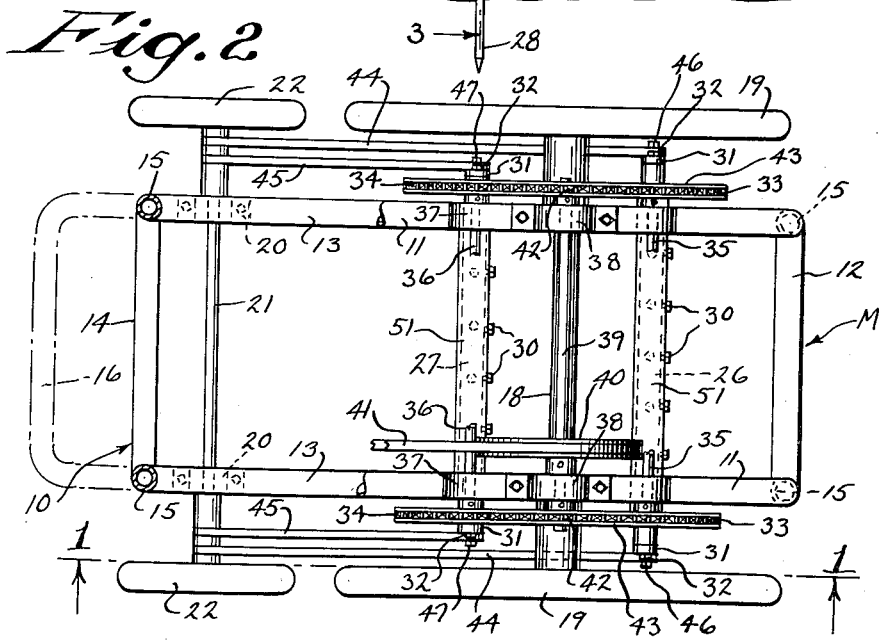
FIGURE 2 is a horizontal sectional view taken through the machine on the line 2—2 of FIGURE 1, looking in the direction of the arrows.

Referring to the drawings in detail, wherein similar reference characters designate corresponding parts throughout the several views, the letter M generally indicates the improved turf and lawn cultivator and the same includes a supporting frame 10, which can be fabricated in different manners and from different characters of material. As illustrated, the frame 10 is formed from tubular stock and includes top longitudinally extending side bars 11 and top transverse connecting bars 12. The frame also includes lower longitudinally extending side bars 13 and connecting transverse bars 14. The top side bars 11 and bottom side bars 13 are connected by front and rear vertically extending corner standards 15. The bottom side bars 13 are preferably arched so as to form a raised front portion, for a purpose, which will later appear. The rear end of the frame can carry a suitable manipulating and pushing handle 16.

The lower faces of the bottom side bars 13 have secured thereto bearing blocks 17 for receiving the front axle 18. The axle has mounted thereon ground wheels 19. At the rear end of the frame, the bottom side bars 13 carry brackets 20 for receiving a rear supporting axle 21. The terminals of this axle have mounted thereon ground wheels 22. The ground wheels 22 are of a much smaller size than the front ground wheels 19, as is best shown in FIGURE 1 of the drawings. The rear axle 21 forms a support for certain mechanism, as will be later pointed out.

Mounted on the top side frame bars 11, adjacent to the rear end of the machine is a drive motor 23, and this motor can be of the internal combustion engine type and of a small size and make well known in the industry. The drive or output shaft 24 of the engine has keyed or otherwise secured thereto a drive pulley wheel 25 for operating the working parts of the machine.

To bring about the proper perforating of the lawn and breaking up of the soil, we provide front and rear supporting bars 26 and 27 for carrying a plurality of soil breaking spikes, or tines 28. The spikes or tines 28 are arranged in a row along each supporting bar and the spikes or tines are preferably equidistantly spaced from one another. The bars are provided with openings 29 and these openings extend entirely through the supporting bars for receiving the spikes or tines 28. Set screws 30 are adjustably carried by the bars for holding the spikes or tines 28 in place. Obviously, by loosening the set screws 30 the spikes or tines can be raised or lowered to suit different working conditions, and individual spikes can be removed and replaced when necessary or desirable. The terminals of the bars 26 and 27 have formed thereon or secured thereto upwardly extending cranks 31 and the upper ends of these cranks are rockably mounted on crank pins 32 carried by front and rear crank wheels 33 and 34. The crank wheels 33 and 34 are arranged in pairs on opposite sides of the machine and can be in the nature of spur gears. These crank wheels 33 and 34 are carried by front and rear shafts 35 and 36 and these shafts are rotatably mounted in suitable bearing blocks 37 mounted upon the upper faces of the side frame bars 11. Mounted on the bearing blocks 37 are transversely aligned bearing blocks 38 and the blocks 38 are arranged between the shafts 35 and 36. The bearing blocks 38 rotatably carry a top countershaft 39 and this countershaft is driven directly from the engine 23. As illustrated, the countershaft 39 has keyed or otherwise secured thereto, a pulley wheel 40 and this pulley wheel is operatively connected to the drive pulley wheel 25 by a pulley belt 41. The pulley wheel 40 is of a much greater diameter than the pulley wheel 25 and the pulley wheels 25 and 40 function as a speed reducing means. The shaft 39 also has keyed thereto a drive spur gear 42. The crank wheels 33 and 34 are operatively connected to the drive spur gear 42 by a sprocket chain 43 and the sprocket chain 43 is trained about the crank wheels 33, 34 and 42. It is to be also noted that the crank wheels 33 and 34 are of a greater diameter than the spur gear 42 and hence, these crank wheels and spur gears also function as a speed reducing mechanism.

From the description so far, it is to be noted that upon the driving of the shaft 39 that the crank wheels 33 and 34 will be rotated and that, through the medium of crank arms 31 the supporting bars 26 and 37 will be continuously raised and lowered. The crank arms 31 of the front and rear bars 26 and 27 are so located on their respective crank wheels 33 and 34 that while one bar is being lowered, for moving its spikes into the ground, the other bar will be raised for moving its spikes from out of engagement with the ground.

To insure the proper and desired movement of the bars and to guide and support the lower ends of the bars during their travel, we provide links 44 for the front bar 26 and short links 45 for the rear bar 27. These pairs of links 44 and 45 are rockably mounted on the axle 21. The forward ends of the links 44 are pivotally connected to the terminals of the front bar 26 by suitable stud bolts 46. The front ends of the links 45 are pivotally connected to the bar 27 by suitable stud bolts 47.

During the movement of the bars 26 and 27 up and down, the links 44 and 45 hold the bars steady against lateral shifting movement and guide these bars and their tines in a desired rocking movement, so that the tines will fully cultivate and break up the soil during their penetration into the soil. As best shown in FIGURE 5, the spikes or tines enter the soil in a forward, inclined position and move to a vertical position with the tines or spikes in their deepest penetrating point, after which the tines rock to a rearwardly inclined withdrawing position from the soil. Actually, the entrance of the spikes or tines into the soil at a forward inclined position, moving to a vertical and then rearwardly inclined position tends to pull the machine over the lawn or turf. Consequently, little effort need be expended by an operator for pushing the machine over a lawn.

In order to clear the spikes or tines 28 from debris, such as leaves, clinging soil etc., each bar 26 and 27 has associated therewith a clearing plate 48. Each clearing plate is slidably mounted on its row of tines below its bar 26 or 27 and each clearing plate is normally held in a raised position against the desired bar by expansion coil springs 49. These springs are coiled about slide rods 50 which slidably extend through their bars 26 or 27 and the lower ends of the slide rods 50 are rigidly secured to the clearing plates 48. The upper ends of the slide rods for each clearing plate is connected by a rigid top plate 51. The springs 49 bear respectively against the bars 26 and 27 and against the top plates 51. The top plates 51 function as foot plates and hence the foot of an operator can be placed thereon and pressed down to move the clearing plates 48 along the spikes or tines.

In FIGURE 6 we have shown a slightly modified form of our invention and in this form, in lieu of the links 44 and 45, we provide guide sleeves 52 for each row of spikes or tines 28. The guide sleeves 52 are rockably carried by cross shafts 53 mounted on brackets 54. The brackets 54 are in turn rigidly secured to the lower face of the bottom side bars 13. During the up and down movement of the spikes, the sleeves will rock and also function as guide and supporting means for the spikes or tines. The sleeves 52 are preferably perforated through the end links, as at 55, and these perforations function as debris clearing openings for the spikes or tines.

From the foregoing description, it can be seen that we have provided a very simple, light and mobile machine which will effectively cultivate a lawn. It is also desired to point out, that as the machine is freely movable over the lawn and that the lawn is acted upon alternately by rows of teeth, that a lawn can be quickly and easily cultivated and with a minimum amount of effort on the part of the operator of the machine.

Changes in details may be made without departing from the spirit or the scope of this invention, but what we claim as new is:

A turf and lawn cultivator comprising a frame having its forward end arched, a transversely extending axle carried by the arched portion of the frame, ground wheels carried by said axle, a rear axle carried by the rear end of the frame, ground wheels of a less diameter than the first mentioned ground wheels carried by the rear axle, transversely extending spaced parallel operating bars disposed below the arched portion of the frame and on opposite sides of the first mentioned axle, said bars being straight and extending substantially the full width of the frame, a plurality of ground working spikes carried by each bar, a pair of crank wheels rotatably mounted on the frame and arranged above the bars and the first mentioned axle, means for synchronously rotating the crank wheels including an engine mounted on said frame, crank pins carried by the crank wheels, depending crank rods rockably mounted upon the crank pins and extending downwardly from the crank wheels to the bars and connected at their lower ends to said bars, and forwardly extending links rockably mounted upon the rear axle and pivotally connected to the terminals of the bars, said links guiding the movement of the bars and spikes during the raising and lowering of the bars by the crank wheels and crank rods, said links being movable in a vertical plane at substantially right angles to the up and down movement of the crank rods.

References Cited in the file of this patent

UNITED STATES PATENTS

| | | |
|---|---|---|
| 265,345 | Stone | Oct. 3, 1882 |
| 1,264,750 | Bacho | Apr. 30, 1918 |
| 1,368,177 | Magistro | Feb. 8, 1921 |
| 1,747,955 | Schertz | Feb. 18, 1930 |
| 2,056,337 | Archibald | Oct. 6, 1936 |
| 2,347,748 | Melling | May 2, 1944 |
| 2,688,907 | Joy | Sept. 14, 1954 |

FOREIGN PATENTS

| | | |
|---|---|---|
| 117,155 | France | Mar. 2, 1877 |
| 792,798 | Great Britain | Apr. 2, 1958 |